(12) United States Patent
Matthews et al.

(10) Patent No.: US 6,679,290 B2
(45) Date of Patent: Jan. 20, 2004

(54) SWING CHECK VALVE

(75) Inventors: John Matthews, Isle de Chenes (CA); Stephen C. Florence, St. Eustache (CA); James Easden, Winnipeg (CA)

(73) Assignee: Dixon Bayco Limited, Winnipeg (CA)

( * ) Notice: Subject to any disclaimer, the term of this patent is extended or adjusted under 35 U.S.C. 154(b) by 0 days.

(21) Appl. No.: 09/976,457

(22) Filed: Oct. 15, 2001

(65) Prior Publication Data

US 2002/0104567 A1 Aug. 8, 2002

(Under 37 CFR 1.47)

Related U.S. Application Data

(63) Continuation-in-part of application No. 09/591,342, filed on Jun. 9, 2000, now Pat. No. 6,314,993.

(51) Int. Cl.$^7$ .............................................. F16K 15/03
(52) U.S. Cl. .................................. 137/527.2; 137/527
(58) Field of Search ............................. 137/535, 527, 137/527.2, 527.4, 527.8

(56) References Cited

U.S. PATENT DOCUMENTS

| | | | | |
|---|---|---|---|---|
| RE10,487 E | * | 6/1884 | Blessing | 137/527.2 |
| 608,450 A | * | 8/1898 | Godfrey | 137/527.2 |
| 1,885,894 A | | 11/1932 | Campbell | |
| 2,934,084 A | * | 4/1960 | Adams | 137/527.4 |
| 3,230,971 A | * | 1/1966 | Rosaen | 137/527 |
| 3,498,322 A | * | 3/1970 | Gilliam | 137/527.2 |
| 3,817,278 A | | 6/1974 | Elliott | |
| 3,974,855 A | * | 8/1976 | Webb | 137/527.4 |
| 4,043,358 A | | 8/1977 | Sliski | |
| 4,098,085 A | * | 7/1978 | McDowell | 137/527 |
| 4,706,706 A | | 11/1987 | Page et al. | |
| 5,305,787 A | * | 4/1994 | Thygesen | 137/527 |
| 5,746,246 A | | 5/1998 | Yokota et al. | |
| 6,050,294 A | | 4/2000 | Makowan | |
| 6,152,173 A | | 11/2000 | Makowan | |

FOREIGN PATENT DOCUMENTS

CA      2310991 A1 *  1/2001

* cited by examiner

*Primary Examiner*—John Rivell
(74) *Attorney, Agent, or Firm*—Adrian B. Battison; Michael R. Williams; Ryan W. Dupuis

(57) ABSTRACT

A check valve has a valve body with an annular seat surrounding the duct and a flap member pivotally mounted on the valve body so as to pivot about an axis transverse to the duct from an open position to a closed position pressing against the seat. The flap member includes a circular flap plate with a rigid backer plate and a front resilient layer carried on a pivot mounting bracket having a rigid mounting plate generally parallel to the backer plate. The backer plate and the mounting plate each have a central hole therethrough and are connected by an integral body molded from a resilient elastomeric material to form the front resilient layer, a back stopper portion and a connecting neck portion arranged so as to provide resilient flexing movement between the flap plate and the mounting bracket. The mounting bracket is carried on a shaft with a pair of coil springs housed in a receptacle separated from the duct so that broken spring parts do not enter the fluid in the housing. The mounting bracket can carried on the main valve body separate from the cover so that the receptacles housing the springs and accessible from the exterior, or the receptacles may be on a second insert or cover piece so that they slide into place and are closed at the end by an outer surface of the main body portion.

9 Claims, 10 Drawing Sheets

SECTION E-E
SCALE 1 : 2

SECTION C-C
SCALE 1 : 2

SWING CHECK VALVE

This application is a Continuation-in-Part of application Ser. No. 09/591,342 filed Jun. 9$^{th}$ 2000 and now issued as U.S. Pat. No. 6,314,993.

This invention relates to a swing check valve also known as a flap valve and particularly to improvements in the construction and mounting of the flap member movable in the check valve.

BACKGROUND OF THE INVENTION

This concept of the flap valve has been in existence in various forms of manufacture for about 500 years. Most of these types of valve are used to allow fluid or gas to move in one direction and stop back flow when pumping is stopped. The valve comprises a valve body having a duct passing through the body with a flap member mounted on the valve body so as to pivot from an open position allowing fluid to flow through the duct to a closed position resting against a seat in the duct and closing the duct to prevent back flow thorough the duct. The valve includes a sealing disc or plate within the valve body with a mounting arrangement which allows the plate to pivot between the open and closed positions. The mounting should have a form of universal joint allowing movement without hindering the sealing such that the disc is able to accommodate wear and or misalignment without failure or allowing seepage. In addition, the valve should be manufacture in a manner which is inexpensive and provides a construction which does not allow metal parts to enter the stream in the event of damage to the valve.

Therefore further improvements to provide enhanced operation and ease of manufacture are still possible.

SUMMARY OF THE INVENTION

It is a one object of the present invention to provide a valve of this type which prevents the metal parts of a biasing spring from entering the fluid stream in the event of breakage of the spring after wear.

According to the invention there is provided a check valve comprising:

BRIEF DESCRIPTION OF THE DRAWINGS

One embodiment of the invention will now be described in conjunction with the accompanying drawings in which.

DETAILED DESCRIPTION

Figure 1:
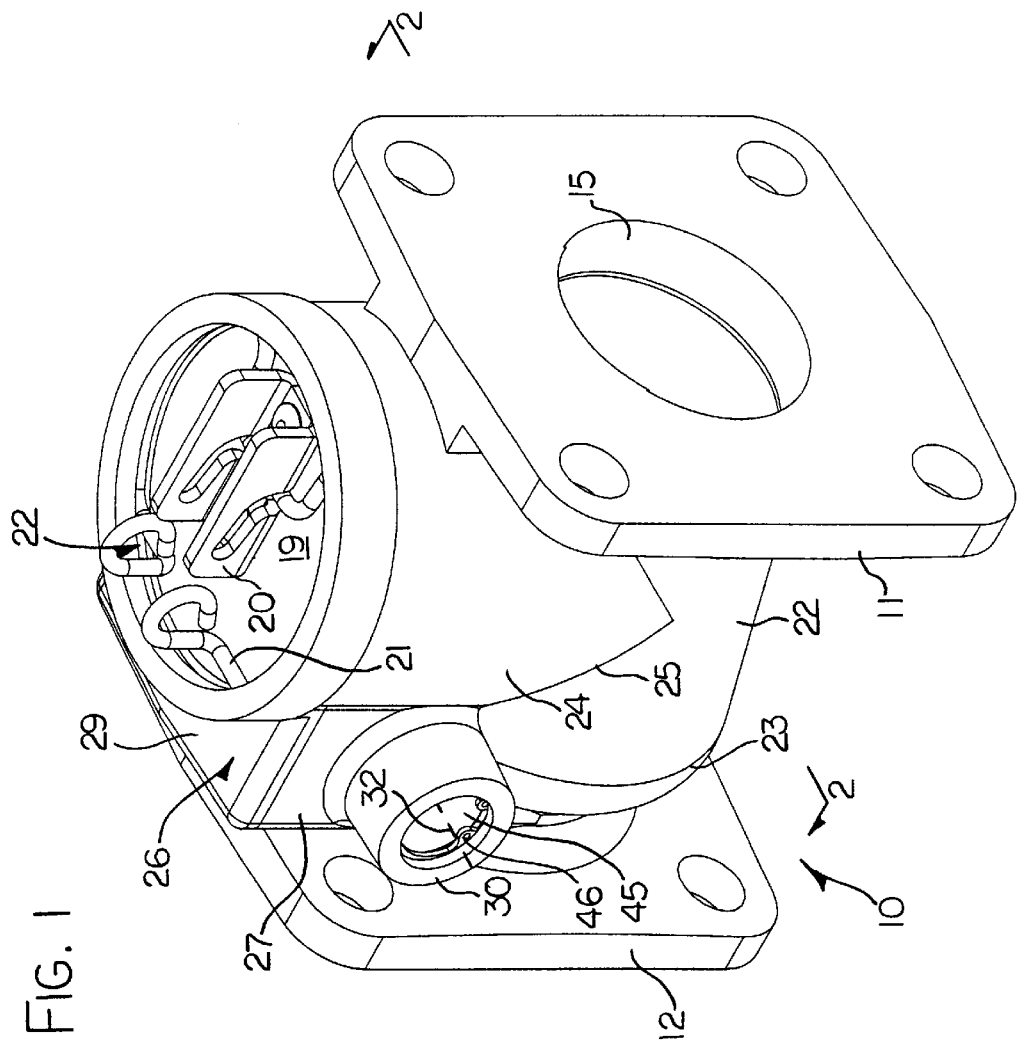
FIG. 1 is an isometric view of a check valve according to the present invention.

The flat valve shown in the FIGS. 1 to 6 of the drawings comprises a valve body generally indicated at 10 which has a first flat mounting flange 11 at one end and a second parallel flat mounting flange 12 at the other end by which the valve may be bolted to a fluid supply conduit. The body 10 further includes a central connection portion 13 defining a duct 14 extending between a hole 15 in the flange 11 and a similar hole 16 in the flange 12.

The mouth 16 forms part of a cylindrical bore 17 defining an annular end face 18 which forms a seat by which the bore 17 can be closed to prevent flow in the reverse direction R.

The hollow interior 14 of the body communicates with an top face 19 of the body. A stop member 20 is mounted on a spring clip 21 in an annular channel 22 of the top 19.

The connecting section 13 of the body 10 has a first portion which defines a frusto-conical wall 22 which diverges outwardly from the mouth 15 at one end toward a widest section 23 adjacent the seat 18. The open top 19 defines a cylindrical section 24 with a vertical axis which interconnects with the frusto-conical section 22 at a join line 25. A rectangular section 26 has vertical side walls 27 and 28 extending upwardly to a top wall 29 which extends from the side of the cylindrical section 24 to the flange 12.

Each vertical wall 27, 28 carries a cylindrical receptacle 30, 31 respectively which defines an axis 32 at right angles to the wall 27 and 28. Thus each receptacle defines a cylindrical wall with an open mouth facing outwardly from the respective wall 27, 28. The cylindrical receptacles are coaxial and thus define supports for a pivot shaft 34 of a flap member 35.

The shaft 34 is square in cross section and extends through each of the walls 27 and 28 spanning the area therebetween with end portions extending into each of the respective receptacles 30, 31.

Each receptacle includes a cylindrical bore 38 and a counter-bore 39 more closely surrounding the shaft 34. A bushing 40 is mounted on the outside surface of the shaft and is received within the counter-bore 39 so as to allow rotation of the shaft relative to the counter-bore. The bushing 40 thus has a square inside shape and a circular outside surface. The bushing 40 defines an end face 41 which projects outwardly from an inside surface of the respective wall 27, 28 and an outer portion 42 which engages against the outside surface of the counter-bore section 39 so as to seal the shaft in the respective side wall 27, 28. The counter bore 39 and/or the bushing 40 thus define a collar surrounding the portion of the shaft extending through the collar.

Outside the bushing 40 is provided a spring 43 in the form of a coil spring surrounding the shaft with one end of the coil spring inserted into a slot 44 in the end of the shaft and a second end of the coil spring engaged into a receptacle in the bore 38. The bore 38 is closed by an end plate 45 held in place by a circlip 46.

Thus the shaft 34 is rotatable in the respective receptacles 30 and 31 and is spring biased in a counter-clockwise direction by the spring 43.

The flap member 35 comprises a mounting bracket 50 having a mounting plate 51 together with a flap plate 52 which has a backer plate 53.

Figure 3:
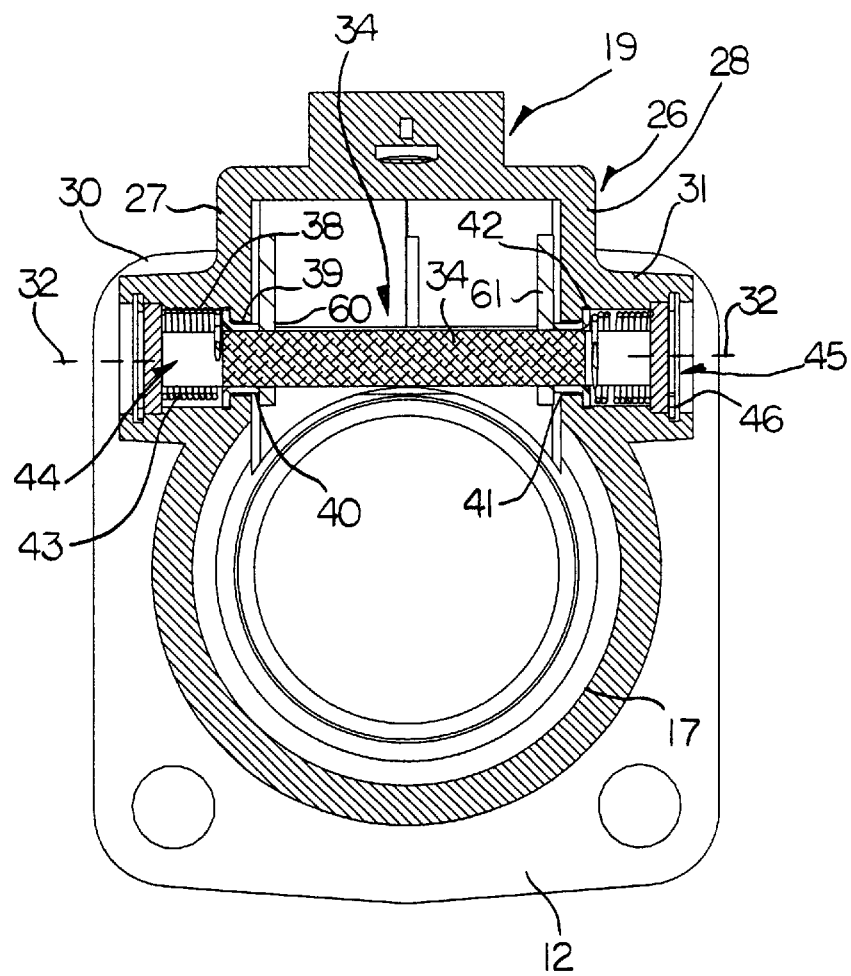
FIG. 3 is a cross sectional view along the lines 3—3 of FIG. 2.
Figure 4:
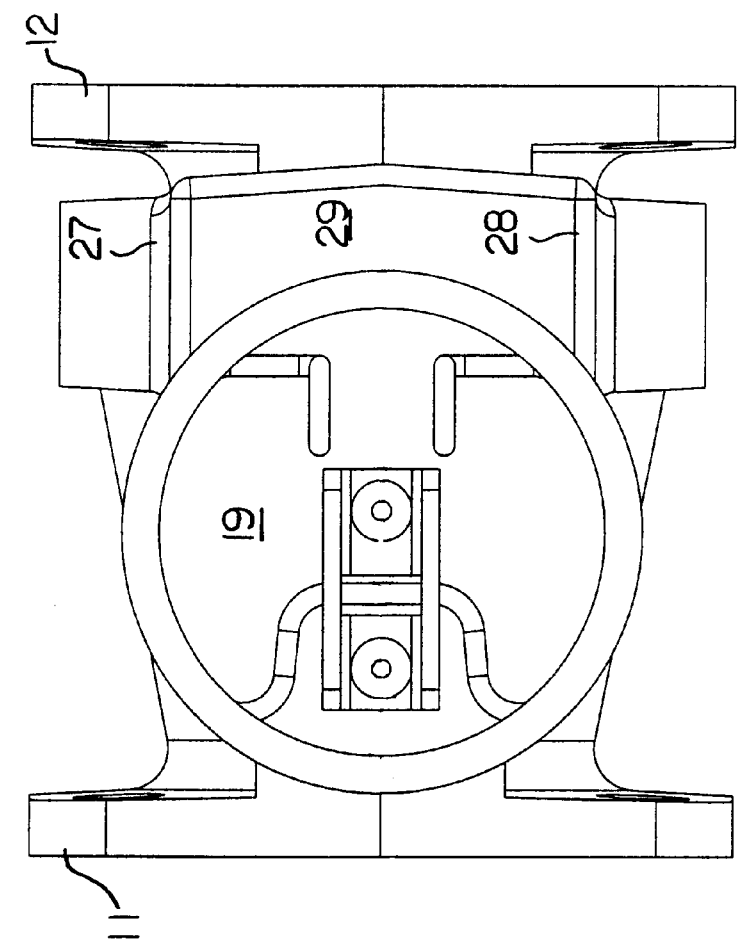
FIG. 4 is a top plan view of the valve of FIG. 1.

The mounting bracket 50 includes a pair of arms 54 and 55 standing in a plane at right angles to the mounting plate 51. Thus side edges of the mounting plate 51 are curved or bent rearwardly so as to project from the mounting plate at right angles thereto thus defining flange portions 57 and 58 of the arms. From the flange portions, the arms include coupling portions 60 and 61 which lie in the same plane as the portions 57 and 58 but extend therefrom to a side of the mounting plate opposite to the portions 57 and 58. Each of the coupling portions 60 and 61 have a square hole 63 which is engaged over the shaft 34. As shown in FIG. 3, the coupling portions 60 and 61 of the arms engages the ends 40 and 41 of the bushing thus locating the arms in place on the shaft.

The flap plate 52 comprises a front resilient layer 70 which covers the circular backer plate 53 and has an outer edge which is coextensive therewith. The resilient layer 70 thus engages the seat 18 in a closing action with the resilient layer providing a seal relative to the fixed rigid annular seat 18.

The flap member further includes a neck section 71 extending between the backer plate 53 and the mounting plate 51 and holding those parallel and spaced.

The flap member further includes a stopper portion 72 which projects outwardly from the rear of the mounting plate 51 in a direction opposite to the front resilient layer 70. The stopper portion converges to a top apex 73 which is arranged for engaging the stop member 19 in the open position of the valve. In addition, the stop member provides an increased mass on the side of the mounting plate opposite to the flap plate so as to locate the center of gravity of the flap member on that side of the pivot thus tending to assist the springs in closing the flap and tending to move the flap to the closed position in the event of a spring failure.

Figure 2:
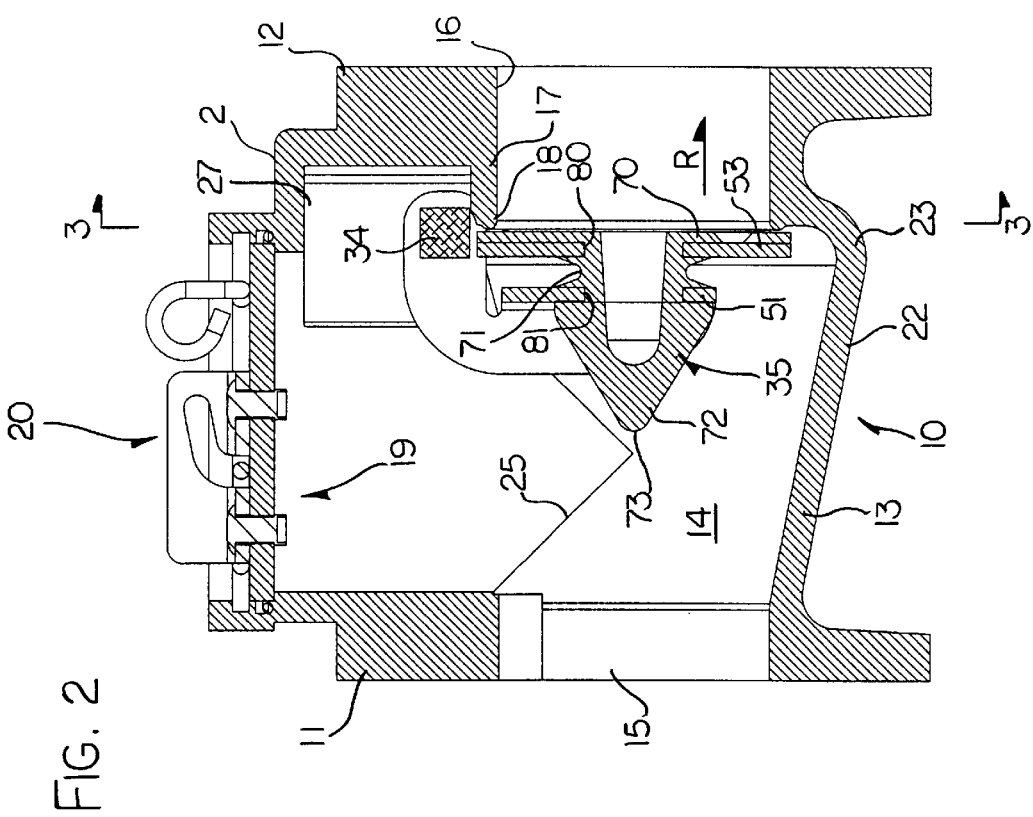
FIG. 2 is a cross sectional view along the lines 2—2 of FIG. 1 showing the valve in a closed position.
Figure 5:
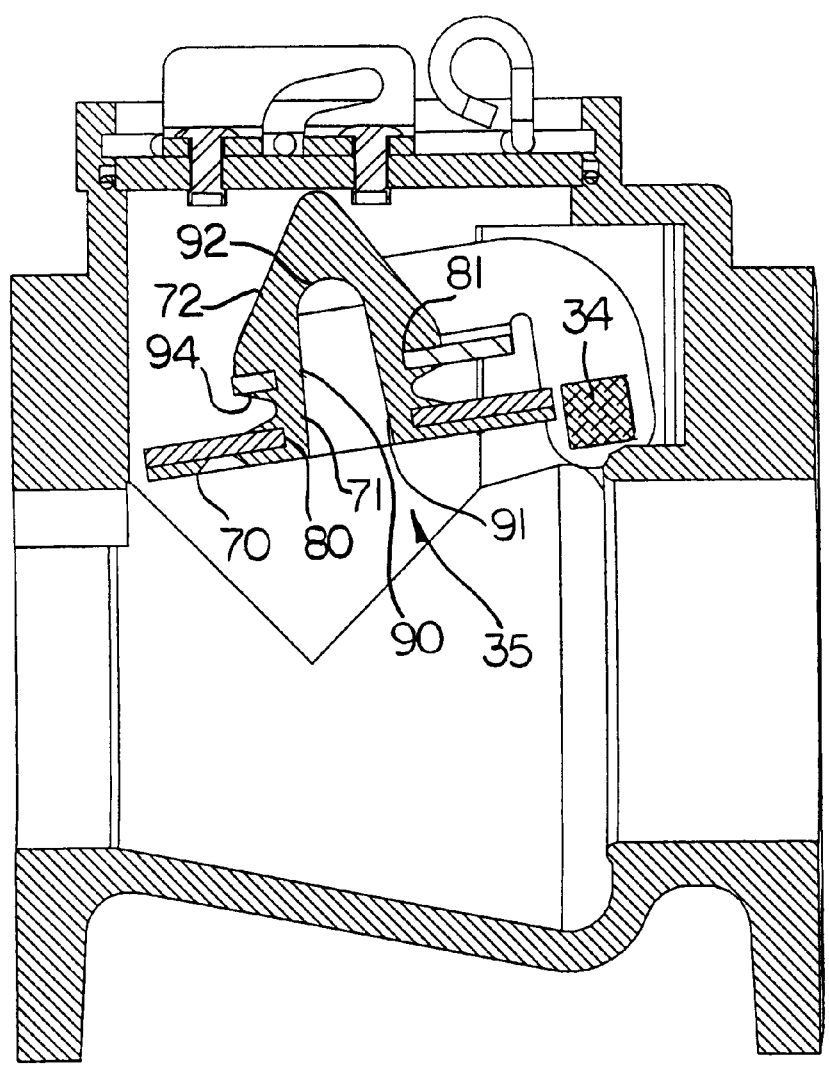
FIG. 5 is a cross sectional view similar to that of FIG. 2 showing the valve in an open position and showing a modified arrangement of the flap member.
Figure 6:
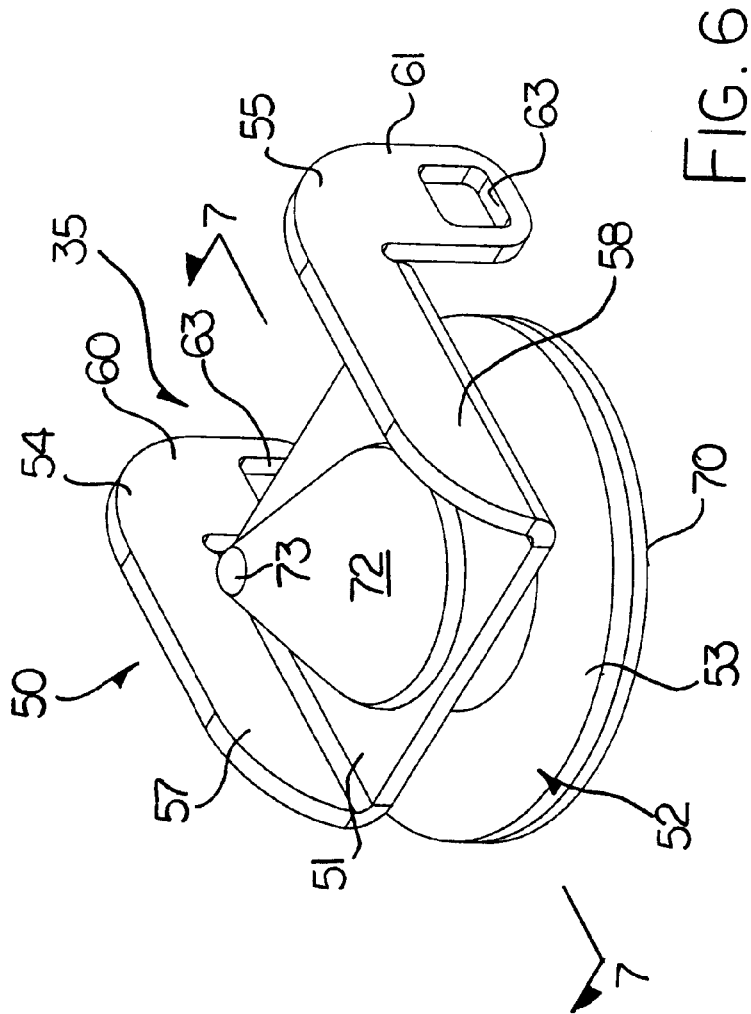
FIG. 6 is an isometric view of the flap member separate from the valve body.
Figure 9:
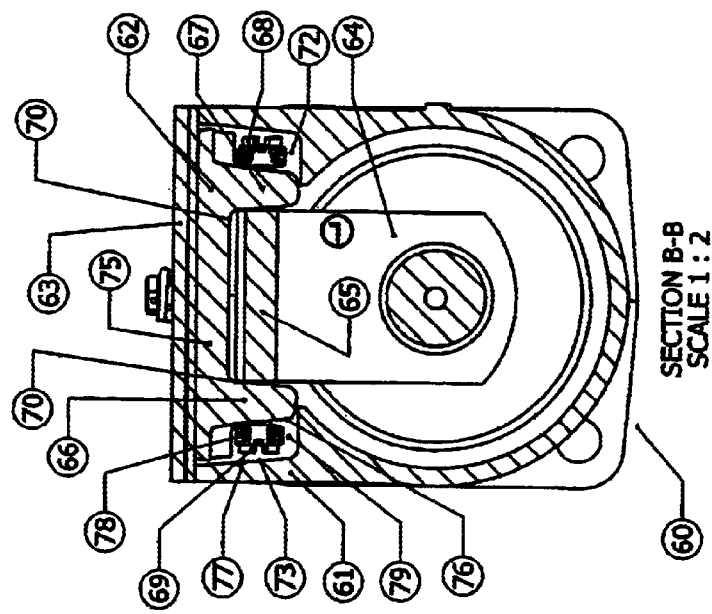
FIG. 9 is a cross sectional view taken along the lines B—B of FIG. 7.
Figure 7:
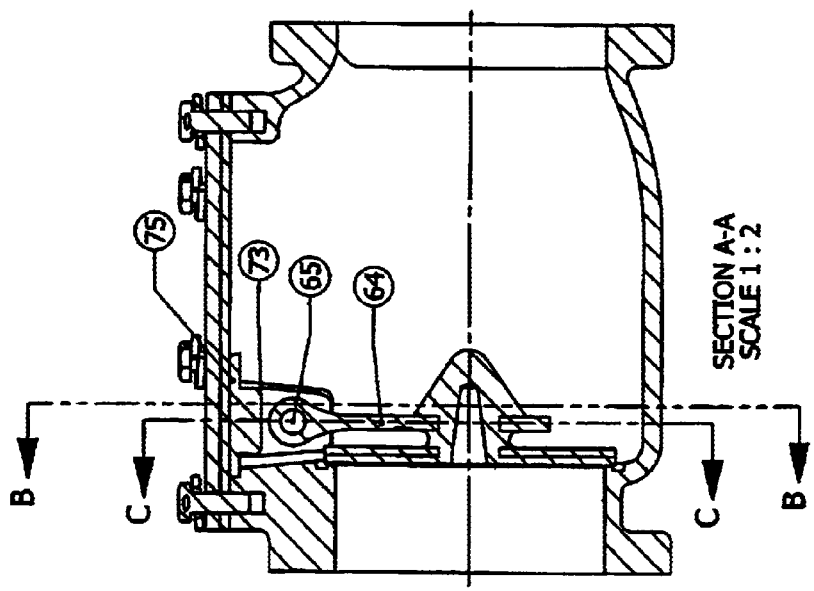
FIG. 7 is a cross sectional view similar to that of FIG. 2 (taken along the lines A—A of FIG. 8) showing a modified arrangement of the mounting for the flap member.
Figure 8:
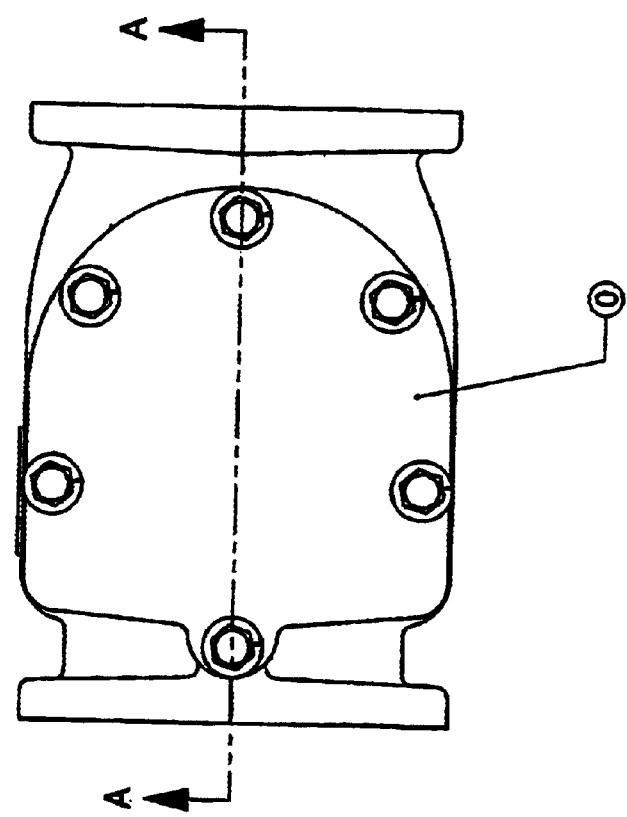
FIG. 8 is a top plan view of the embodiment of FIG. 7.
Figure 13:
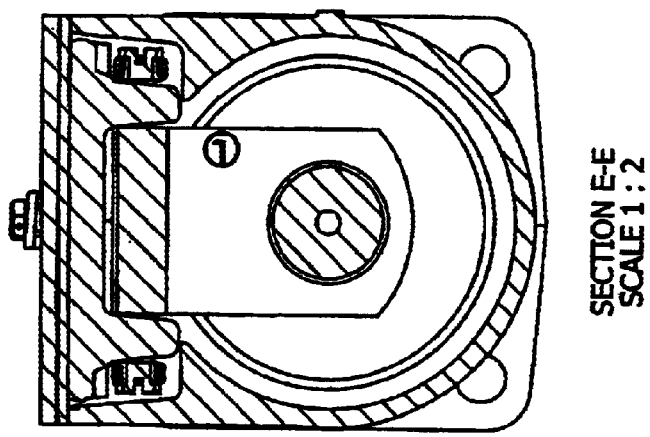
FIG. 13 is a cross sectional view taken along the lines E—E of FIG. 11.
Figure 10:
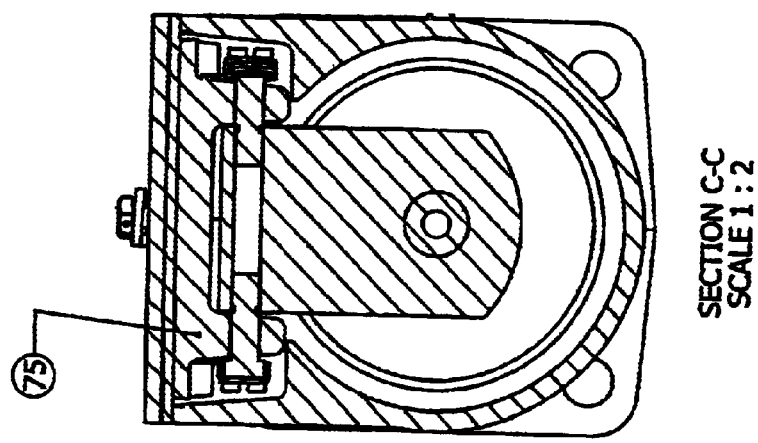
FIG. 10 is a cross sectional view similar to that of FIG. 3 taken along the lines C—C of FIG. 7.
Figure 12:
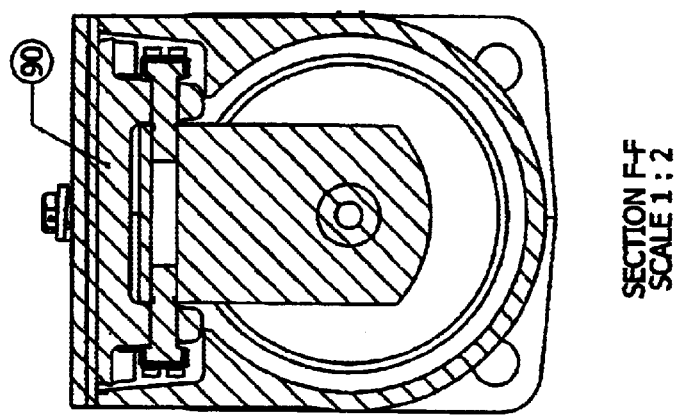
FIG. 12 is a cross sectional view similar to that of FIG. 3 taken along the lines F—F of FIG. 11.
Figure 11:
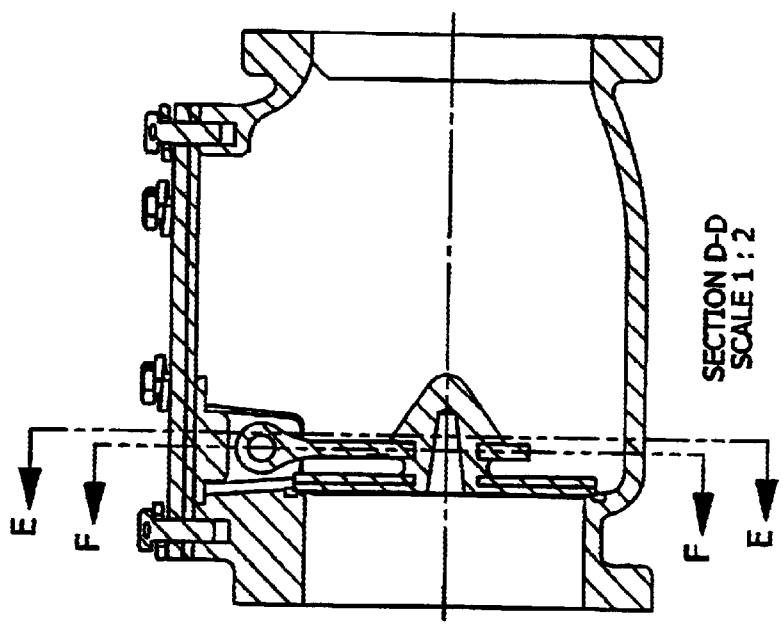
FIG. 11 is a cross sectional view similar to that of FIG. 7 showing a further modified arrangement of the mounting for the flap member.

The flap member is thus pivotal from the closed position shown in FIG. 2 to the open position shown in FIG. 5 by rotational movement of the shaft in the receptacles against the bias of the spring. The extreme of the, open movement causes the apex of the stop portion to engage the stop member. The flap member is held in the open position shown in FIG. 5 by the flow of fluid through the body from the mouth 16 to the mouth 15 thus holding the resilient layer of the flap member above the mouth 15 due to the pressure of the flow against the underside of the resilient layer.

The resilient layer 70, the neck section 71 and the stopper portion 72 are all formed by integral moulding from a resilient elastomeric material to form an integral body integrally connecting the backer plate and the mounting plate. Thus the backer plate 53 has a central hole 80 and the mounting plate 51 has a central hole 81 which are aligned and of the same diameter. The integral moulding of the resilient elastomeric material therefore forms the resilient layer 70 on the front face of the backer plate and at the same time passes through the hole 80 to form the neck portion and also passes through the hole 81 to form the stopper portion. The moulding intimately bonds the resilient material to the plates so that the outside edge of the stopper portion extends outwardly from the hole 81 onto the adjacent surface of the mounting plate. Similarly the neck portion extends from the holes 80 and 81 onto the adjacent surfaces of the plates 51 and 53. The resilient layer covers and is intimately bonded to the adjacent face of the backer plate.

The resilience of the elastomeric material is selected so that the material and its construction provide flexibility between the mounting plate and the backer plate. Thus the neck section defines a universal joint which allows the backer plate to pivot in all directions relative to the mounting plate to take up any inconsistencies in the alignment between the seat 18 and the mounting plate. These inconsistencies in alignment can occur due to wear to due to tolerances made in manufacture.

As shown in FIG. 5, the resilience of the neck section is increased by providing a bore 90 which extends from the mouth 91 at the center of the resilient layer 70 through to a blind end 92 within the stopper 72. This reduces the amount of resilient material used in the construction and also makes the structure lighter. However the main function is that the amount of material at the neck section 71 is significantly reduced since the neck section is now annular in shape. Thus flexibility at the neck section is increased allowing increased pivotal movement and a reduced pressure for effecting such pivotal movement.

The neck section is further reduced by an annular recess 94 provided in the outside surface of the neck so that the outside diameter of the neck section is reduced to a diameter approximately equal to the inside diameter of the holes 80 and 81. This reduces the thickness of the annular neck section to that portion between the base of the recess 94 and the inside of the hole 90 thus significantly increasing the resilience of the neck section.

The neck section thus defined above therefore provides a simple inexpensive technique for manufacturing the flap member which allows the necessary pivotal movement between the pivot mounting and the flap face to ensure alignment of the flap face with the annular seat thus preventing leakage of seepage.

The mounting of the coil springs in receptacles which are external to the bushings thus ensures that the breakage of a spring does not allow spring parts to enter the fluid since the springs are maintained exterior to the body. In the event of flap valve failure, therefore, no parts enter the fluid which could cause damage to or blockage of parts downstream of the valve.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

What is claimed is:

1. A check valve comprising:
   a valve body having a duct through the body with an annular seat surrounding the duct through which a fluid can flow;
   a flap member pivotally mounted on the valve body so as to pivot about an axis transverse to the duct from an open position allowing the fluid to flow through the duct to a closed position pressing against the seat in the duct and closing the duct to prevent back flow through the duct;
   a spring biasing the flap member to the dosed position such that flow of fluid through the duct in a forward direction causes the flap member to be opened from the seat against the bias of the spring to the open position;
   the flap member including a flap body and a pivot member for supporting the flap body for said pivotal movement of the flap body about the axis;
   the pivot member defining a pair of shaft end portions projecting axially outwardly in opposite directions from the flap body;

wherein the valve body defines for each shaft end portion a collar surrounding and locating the shaft end portion for rotation relative thereto about the axis;

wherein the valve body defines for each shaft end portion a receptacle surrounding the shaft end portion and located axially outwardly of the collar such that the receptacle is separated by the collar from the duct;

and wherein the spring comprises two spring elements each of which is mounted on a respective one of the shaft end portions within the respective receptacle so as to be separated from the duct and is prevented from entering the duct in the event of breakage of the spring;

wherein the valve body includes a first main body portion defining the duct and a second body portion located in a receiving location in the first main body portion and removable from the first main body portion;

wherein the second body portion includes the collars locating the respective shaft end portion such that the removable second body portion carries with it when removed, the flap member;

and wherein each receptacle is at least partly defined by the second body portion and located inside the first body portion such that the sprint element within the receptacle is separated from the duct.

2. The check valve according to claim 1 wherein the collar includes a bushing closely surrounding the shaft such that the spring element is outside the collar.

3. The check valve according to claim 1 wherein each spring element comprises a coil spring surrounding the shaft end portion.

4. The check valve according to claim 1 wherein the pivot member is arranged such that the axis is generally parallel to a plane of the flap body and offset to one side of the flap body.

5. The check valve according to claim 1 wherein the receptacle is partly defined by the first main body portion and partly by the second body portion such that the spring element within the receptacle is separated from the duct.

6. The check valve according to claim 1 wherein the valve body further includes a cover for closing an opening in the first main body portion and wherein the second body portion comprises an insert arranged to be inserted into the receiving portion within the first main body portion for covering by the cover.

7. The check valve according to claim 1 wherein the second body portion main a cover for closing an opening in the first main body portion.

8. The check valve according to claim 1 wherein the second body portion is inserted into the first main body portion in a sliding action at right angles to the axis.

9. The check valve according to claim 8 wherein the receptacle comprises an end face of the collar and a part surrounding surface of the second body portions, and an end surface opposite the collar generally at right angles to the axis and a part surrounding surface of the first main body portion such that the part surrounding surfaces of the first and second body portions co-operate to close the receptacle to prevent escape of a part of the spring element in the event of a breakage.

* * * * *